United States Patent
Epping et al.

(10) Patent No.: US 10,437,081 B2
(45) Date of Patent: Oct. 8, 2019

(54) INTEGRATED-OPTICS-BASED STRESS-OPTIC PHASE MODULATOR AND METHOD FOR FORMING

(71) Applicant: LioniX International BV, Enschede (NL)

(72) Inventors: Jörn Philipp Epping, Münster (DE); Arne Leinse, Borne (NL); René Gerrit Heideman, Oldenzaal (NL)

(73) Assignee: LioniX International BV, Enschede (NL)

( * ) Notice: Subject to any disclaimer, the term of this patent is extended or adjusted under 35 U.S.C. 154(b) by 0 days.

(21) Appl. No.: 16/265,785

(22) Filed: Feb. 1, 2019

(65) Prior Publication Data

US 2019/0171043 A1 Jun. 6, 2019

Related U.S. Application Data

(62) Division of application No. 15/875,340, filed on Jan. 19, 2018, now Pat. No. 10,241,352.

(Continued)

(51) Int. Cl.
*G02F 1/01* (2006.01)
*G02F 1/025* (2006.01)
(Continued)

(52) U.S. Cl.
CPC ....... *G02F 1/0134* (2013.01); *G02B 6/02076* (2013.01); *G02B 6/29353* (2013.01);
(Continued)

(58) Field of Classification Search
CPC ........ G02F 1/0134; G02F 1/025; G02F 1/225; G02F 2203/20
See application file for complete search history.

(56) References Cited

U.S. PATENT DOCUMENTS

| 5,313,535 A | 5/1994 | Williams |
| 5,339,370 A | 8/1994 | Sano et al. |

(Continued)

FOREIGN PATENT DOCUMENTS

| JP | 06-186513 A | 7/1994 |
| JP | 2009-205154 A | 9/2009 |

OTHER PUBLICATIONS

Silvano Donati et al., "Piezoelectric Actuation of Silica-On-Silicon Waveguide Devices", dated Oct. 1, 1998, "IEEE Photonics Technology Letters", Publisher: IEEE, vol. 10, No. 10, pp. 1428-1430.

(Continued)

*Primary Examiner* — Daniel Petkovsek
(74) *Attorney, Agent, or Firm* — Kaplan Breyer Schwarz, LLP

(57) ABSTRACT

A phase controller for controlling the phase of a light signal in a surface waveguide and a method for its fabrication are disclosed. The phase controller controls the phase of the light signal by inducing stress in the waveguide structure, thereby controlling the refractive indices of at least some of its constituent layers. The phase controller includes a phase-control element formed on topographic features of the top cladding of the waveguide, where these features (1) provide a shape to the phase-control element that matches the shape of the mode field of the light signal and (2) give rise to stress-concentration points that focus and direct induced stress into specific regions of the waveguide structure, thereby providing highly efficient phase control. As a result, the phase controller can operate at a lower voltage, lower power, and/or over a shorter interaction length than integrated-optic phase controllers of the prior art.

14 Claims, 8 Drawing Sheets

Related U.S. Application Data

(60) Provisional application No. 62/448,112, filed on Jan. 19, 2017.

(51) Int. Cl.
  *G02B 6/293* (2006.01)
  *G02B 6/02* (2006.01)
  *G02F 1/225* (2006.01)
  *G02B 6/12* (2006.01)

(52) U.S. Cl.
  CPC .............. *G02F 1/025* (2013.01); *G02F 1/225* (2013.01); *G02B 2006/12097* (2013.01); *G02B 2006/12142* (2013.01)

(56) References Cited

U.S. PATENT DOCUMENTS

| | | | |
|---|---|---|---|
| 5,617,499 | A | 4/1997 | Brueck et al. |
| 6,221,565 | B1 | 4/2001 | Jain et al. |
| 6,385,354 | B1 | 5/2002 | Digonnet et al. |
| 6,453,086 | B1 | 9/2002 | Tarazona |
| 6,584,240 | B2 | 6/2003 | Doi et al. |
| 6,778,751 | B2 | 8/2004 | Tada et al. |
| 7,426,326 | B2 | 9/2008 | Moeller et al. |
| 7,627,203 | B2 | 12/2009 | Chen et al. |
| RE41,204 | E | 4/2010 | Jain et al. |
| 8,027,554 | B2 | 9/2011 | Takahashi |
| 8,983,238 | B2 * | 3/2015 | Bratkovski ........ G02B 6/12007 385/131 |
| 9,221,074 | B2 | 12/2015 | Heideman et al. |
| 10,241,352 | B2 * | 3/2019 | Epping ................. G02F 1/0134 |
| 2003/0035611 | A1 | 2/2003 | Shi |
| 2004/0203313 | A1 | 10/2004 | Ramamoorthi et al. |
| 2009/0245714 | A1 | 10/2009 | Bratkovski et al. |
| 2015/0110441 | A1 | 4/2015 | Heideman et al. |
| 2018/0203262 | A1 | 7/2018 | Epping et al. |

OTHER PUBLICATIONS

Notice of Allowance and Fees Due (PTOL-85) received for U.S. Appl. No. 15/875,340, dated Nov. 30, 2018, 8 pages.

Non-Final Office Action received for U.S. Appl. No. 15/875,340, dated Aug. 2, 2018, 10 pages.

K. K. Tsia et al., "Electrical tuning of birefringence in silicon waveguides", DOI: 10.1063/1.2883925, "Applied Physics Letters", Publisher: American Institute of Physics, dated Feb. 14, 2008, 4 pages.

Francesco Morichetti et al., "Box-Shaped Dielectric Waveguides: A New Concept in Integrated Optics?", "Journal of Lightwave Technology", Sep 1, 2007, 2579-2589, vol. 25, No. 9.

Authorized Officer: Diot, Patrick, International Search Report and Written Opinion issued in PCT application No. PCT/IB2019/050451, dated Apr. 24, 2019, 11 pp.

* cited by examiner

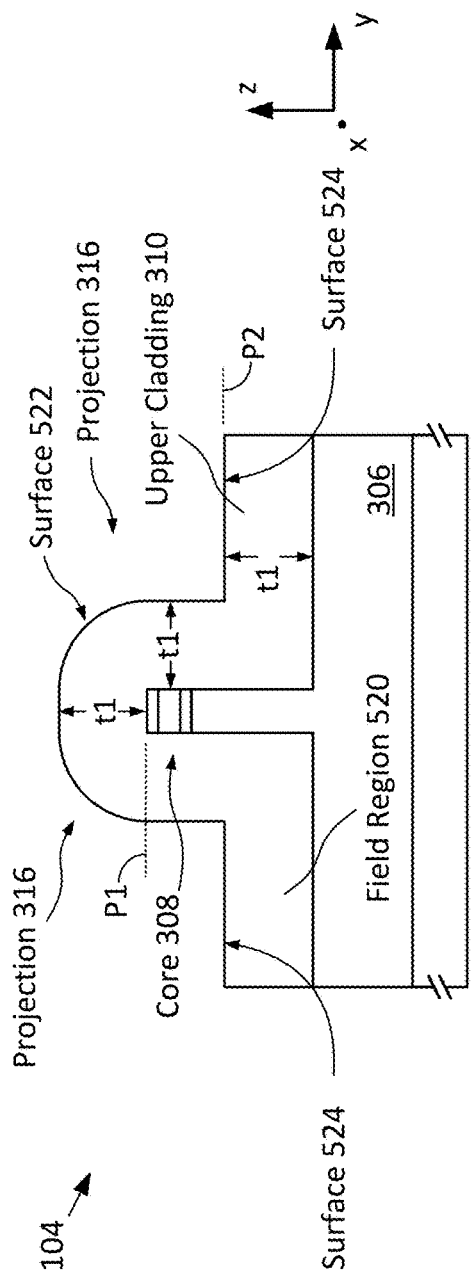
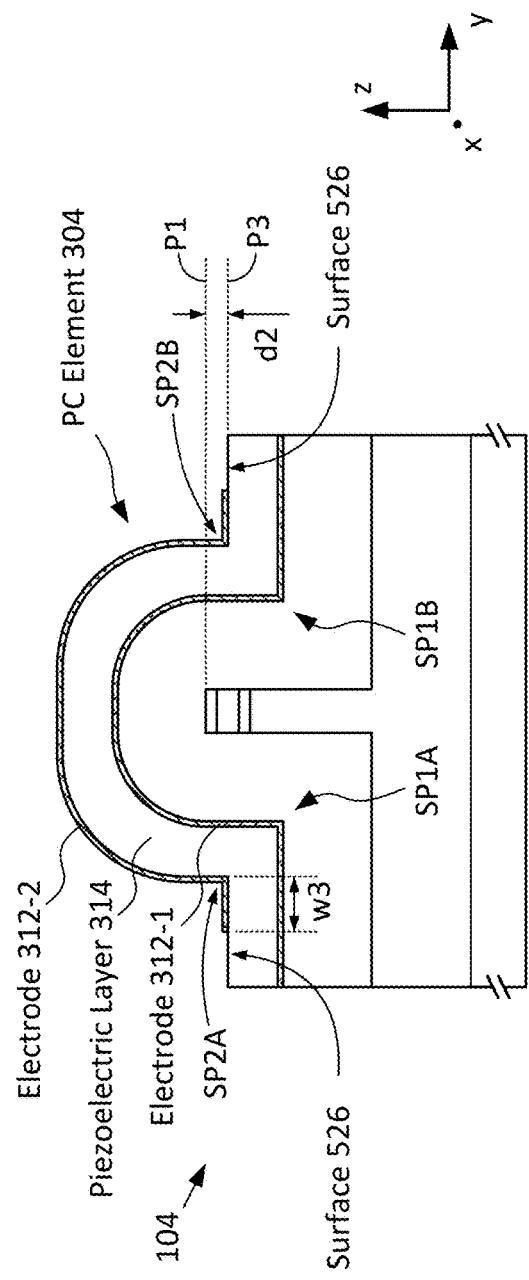
FIG. 5C
FIG. 5D

INTEGRATED-OPTICS-BASED STRESS-OPTIC PHASE MODULATOR AND METHOD FOR FORMING

CROSS REFERENCE TO RELATED APPLICATIONS

This application is a divisional application of U.S. patent application Ser. No. 15/875,340 (now U.S. Pat. No. 10,241,352 B2), filed Jan. 19, 2018, which claims the benefit of U.S. Provisional Application Ser. No. 62/448,112, filed Jan. 19, 2017, entitled "Phase Controller Comprising a Stress-Inducing Phase Modulator", each of which is incorporated by reference, in its entirety, as if set forth at length herein. If there are any contradictions or inconsistencies in language between this application and one or more of the cases that have been incorporated by reference that might affect the interpretation of the claims in this case, the claims in this case should be interpreted to be consistent with the language in this case.

BACKGROUND OF THE INVENTION

A Planar Lightwave Circuit (PLC) is an optical system comprising one or more integrated-optics waveguides that are integrated on the surface of a substrate, where the waveguides are typically combined to provide complex optical functionality. These "surface waveguides" typically include a core of a first material that is surrounded by a second material having a refractive index that is lower than that of the first material. The change in refractive index at the interface between the materials enables reflection of light propagating through the core, thereby guiding the light along the length of the surface waveguide.

PLC-based devices and systems have made significant impact in many applications, such as optical communications systems, sensor platforms, solid-state projection systems, and the like. Surface-waveguide technology satisfies a need in these systems for small-sized, reliable optical circuit components that can provide functional control over a plurality of optical signals propagating through a system. Examples include simple devices (e.g., 1×2 and 2×2 optical switches, Mach-Zehnder interferometer-based sensors, etc.), as well as more complex, matrix-based systems having multiple surface waveguide elements and many input and output ports (e.g., wavelength add-drop multiplexers, cross-connects, wavelength combiners, etc.).

Common to most of these systems is a need for a switching element. Historically, the most common switching elements suitable for use in a PLC are based on a device known as a thermo-optic (TO) phase controller. A TO phase controller takes advantage of the fact that the refractive index (i.e., the speed of light in a material) of glass is temperature-dependent (referred to as the thermo-optic effect) by including a thin-film heater that is disposed on the top of the upper cladding of a surface waveguide. Electric current passed through the heater generates heat that propagates into the cladding and core materials, changing their temperature and, thus, their refractive indices. TO phase controllers have demonstrated induced phase changes as large as $2\pi$.

To form an optical switching element, a TO phase controller is typically included in a surface waveguide element, such as a Mach-Zehnder interferometer (MZI). In an MZI switch arrangement, an input optical signal is split into two equal parts that propagate down a pair of substantially identical paths (i.e., arms) to a junction where they are then recombined into an output signal. One of the arms incorporates a TO phase controller that controls the phase of the light in that arm. By imparting a phase difference of $\pi$ between the light-signal parts in the arms, the two signals destructively interfere when recombined, thereby canceling each other out to result in a zero-power output signal. When the phase difference between the light-signal parts is 0 (or $n*2\pi$, where n is an integer), the two signals recombine constructively resulting in a full-power output signal.

Unfortunately, prior-art PLC-based switching elements have disadvantages that have, thus far, limited their adoption in many applications. First, TO phase controllers consume a great deal of power. Further, in addition to heating the core and cladding materials directly below the heater element, heat from the thin-film heater also diffuses laterally in the glass, which can lead to thermal crosstalk between adjacent surface waveguides. Still further, glass has a low thermal conductivity coefficient, which results in heating and cooling times that are long (typically, on the order of milliseconds). Thermal crosstalk also limits the density with which heating elements can be formed, limiting the number of TO phase controllers that can be included on a single chip. As a result, TO phase controllers are poorly suited for many applications.

More recently, the photo-elastic effect has been exploited as an alternative to thermo-optic tuning of the refractive index of the materials of a surface waveguide. Phase shifting of a light signal in surface waveguides based on the photo-elastic effect was disclosed, for example, by S. Donati, et al., in "Piezoelectric Actuation of Silica-on-Silicon Waveguide Devices," published in *IEEE Photonics Technologies Letters*, Vol. 10, pp. 1428-1430 (1998), and by Tsia, et al., in "Electrical Tuning of Birefringence in Silicon Waveguides," App. Phys. Lett., Vol. 92, 061109 (2008), and in U.S. Pat. Nos. 9,221,074 and 9,764,352, each of which is incorporated herein by reference. While phase shifting on the order of a microsecond with low power dissipation was demonstrated, the efficiency with which a phase change could be induced in the constituent layers (particularly the core layer) of the surface waveguides was poor. As a result, very high voltages and large interaction lengths were required, which limits the utility of prior-art photo-elastic-based phase tuning in practical PLC systems.

The need for an efficient integrated-optics phase tuning technology that enables fast, low-power-consumption operation remains, as yet, unmet in the prior art.

SUMMARY OF THE INVENTION

The present invention enables photo-elastic-based phase control of a light signal propagating in a surface waveguide with higher efficiency than the prior art. Embodiments of the present invention are particularly well suited for use in applications such as telecommunications, data communications, projection systems, and sensors.

Like prior-art stress-optic phase controllers, embodiments of the present invention employ a phase-control element disposed on a topological feature of a surface waveguide to induce laterally and vertically directed stress into its constituent layers. In the prior-art, these topological features are either formed as part of the upper cladding of the waveguide or are due to deposition of the upper cladding layer over the structure of the core itself.

In contrast to the prior art, in embodiments of the present invention, the topological feature is a projection of upper cladding material that is formed by partially etching the lower cladding to create a ridge-like projection and overcoating this projection via conformal deposition of the upper cladding material. As a result, the present invention provides independent control over the geometry of the waveguide core, the thicknesses of the upper and lower cladding layers, and the relative positions of the waveguide core and the phase-control element, which enables application of the present invention to virtually any surface waveguide structure and technology. Embodiments in accordance with the present invention, therefore, are suitable for use with virtually any surface waveguide technology, including ridge waveguides, channel waveguides, low-index-contrast waveguides, high-index-contrast waveguides, surface waveguides having homogeneous core structures, surface waveguides having cores comprising multiple layers of different materials, and surface waveguides formed in a wide range of material systems.

Furthermore, the independence of the waveguide core and the cladding layer structure enables the position of the phase-control element, relative to the waveguide core, to be selected to facilitate the efficiency with which it induces stress into the core. For example, stress-concentration points in the phase-control element can reside at the same height or below the top surface of the waveguide core, thereby enabling refractive-index changes in the light-guiding materials to be more efficiently induced.

An illustrative embodiment of the present invention is a phase controller comprising a stress-optic phase-control element disposed on a projection formed by partially etching the lower core of a waveguide to define a ridge and conformally depositing the upper core layer over the ridge. The phase-control element is formed on the projection such that its shape substantially matches the shape of the optical mode supported by the waveguide core. In addition, the phase-control element extends down the sides of the projection to realize stress-concentration points that are below the top surface of the core of the waveguide and can more effectively impart stress into the core materials.

In addition, the projection on which the phase-control element is disposed has a shape that substantially matches the shape of the optical mode supported by the waveguide. As a result, the phase-control element is in close proximity to a greater portion of the perimeter of the mode field, thereby increasing its effectiveness in inducing a desired phase delay.

In some embodiments, the depth to which the lower cladding is etched and the thicknesses of the top cladding layer and the phase-control element are selected to realize a structure in which the top of the phase-control element is substantially aligned with the top of the core.

An embodiment of the present invention is a phase controller comprising: a surface waveguide (302) disposed on a substrate (116), the surface waveguide including a lower cladding (306), a core (308), and an upper cladding (310) comprising a projection (316) and a field region (520), wherein the surface waveguide supports a mode field (324) having a first shape; and a phase-control (PC) element (304) disposed on at least a portion of the projection, wherein the PC element comprises a first electrode (312-1), a second electrode (312-2), and a piezoelectric layer (314) that is between the first and second electrodes; wherein the core has a first surface (514) that defines a first plane (P1), and wherein the field region has a second surface (526) that defines a second plane (P3), and further wherein the second plane is at or below the height of the first plane; wherein the PC element includes a first stress-concentration point (SP1A) that is at or below the height of the first plane; and wherein the PC element has a shape that is substantially matched to the shape of the mode field.

Another embodiment of the present invention is a method for forming a phase controller (104), the method comprising: providing a waveguide (302) that is operative for conveying a light signal (112) having a mode field (324) having a first shape, the waveguide comprising: a first cladding (306) having a first field region (516) and a spine (530) that projects from the first field region; a core (308) that is disposed on the spine, wherein the core has a first surface (514) that defines a first plane (P1), and wherein the core and the spine collectively define a ridge (518); and a second cladding (310) that includes a second field region (520) and a projection (316) that projects from the second field region, wherein the second cladding is conformally disposed on the first field region and the ridge such that the ridge and the second cladding collectively define the projection, and wherein the second field region has a second surface (524) that defines a second plane (P2); and forming a phase-control (PC) element (304) comprising: a first electrode (312-1) that is in direct contact with the third surface; a second electrode (312-2) that is distal to the third surface; and a piezoelectric layer (314) that is between the first and second electrodes.

BRIEF DESCRIPTION OF THE DRAWINGS

FIGS. 5A-D depict schematic drawings of cross-sectional views of phase controller 104 at different points in its fabrication.

DETAILED DESCRIPTION

For the purposes of the present Specification, including the appended claims, the following terms are defined:

"Disposed on" and "Formed on" are defined as "exists on" an underlying material or layer either in direct physical contact or with one or more intervening layers. For example, if a material is described to be "disposed (or grown) on a substrate," this can mean that either (1) the material is in intimate contact with the substrate; or (2) the material is in contact with one or more layers that already reside on the substrate. It should be noted that a conformal layer is considered disposed on each surface of a structure to which it conforms;

"integrated-optics waveguide," "surface waveguide," and "waveguide" are used interchangeably and defined to mean a PLC-based waveguiding structure comprising a lower cladding layer, a core, and an upper cladding layer formed on the surface of a substrate;

"mode-field diameter" is defined as the distance from the center of a guided optical mode at which the electric and magnetic field strengths are reduced to 1/e of their maximum values (typically located at the center of the mode).

Figure 1:
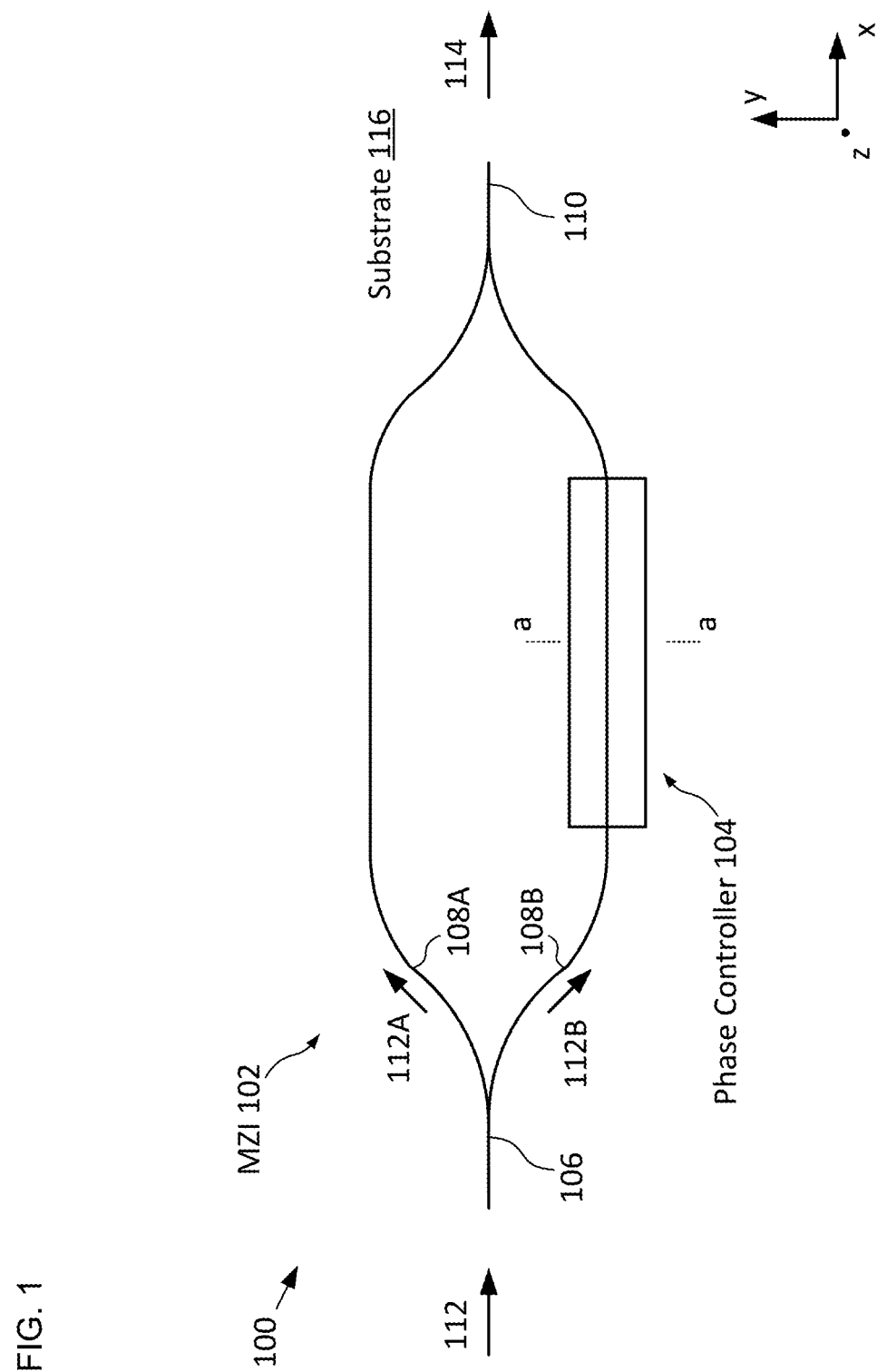
FIG. 1 depicts a schematic drawing of a top view of a PLC-based optical switch comprising an integrated-optic-based stress-optic phase controller in accordance with an illustrative embodiment of the present invention.

FIG. 1 depicts a schematic drawing of a top view of a PLC-based optical switch comprising an integrated-optic-based stress-optic phase controller in accordance with an illustrative embodiment of the present invention. Switch 100 includes Mach-Zehnder Interferometer 102 and phase controller 104. Although the illustrative embodiment is a PLC comprising an integrated-optics switch, it will be clear to one skilled in the art, after reading this Specification, how to specify, make, and use alternative embodiments of the present invention that include any PLC system and/or surface waveguide layout.

Mach-Zehnder Interferometer (MZI) 102 includes input waveguide 106, arms 108A and 108B, and output waveguide 110, which are arranged such that, as light signal 112 propagates through input waveguide 106, its optical energy is split equally into light signals 112A and 112B, which propagate through arms 108A and 108B, respectively, to output waveguide 110 where they combine to form output signal 114.

In the depicted example, the lengths of arms 108A and 108B are designed such that light signals 112A and 112B are in phase and constructively combine at output waveguide 110 when phase controller 104 is in its quiescent state. As a result, when no control voltage is applied to phase controller 104, the intensity of output signal 114 is substantially equal to the intensity of input signal 112 (neglecting propagation loss in the waveguides of MZI 102).

When phase controller 104 is activated, however, it induces a stress in the waveguide structure of arm 108B, which gives rise to a change in the speed at which light signal 112B travels through the arm. The magnitude of this induced stress is controlled to control the phase difference between light signals 112A and 112B when they recombine, thereby enabling control over the magnitude of output signal 114.

As noted above, phase control for a light signal in a surface waveguide based on the photo-elastic effect is known in the prior art; however, known stress-optic phase controllers are inadequate to the task in many applications due to the fact that they do not efficiently induce stress where needed in the waveguide structure.

Figure 2:
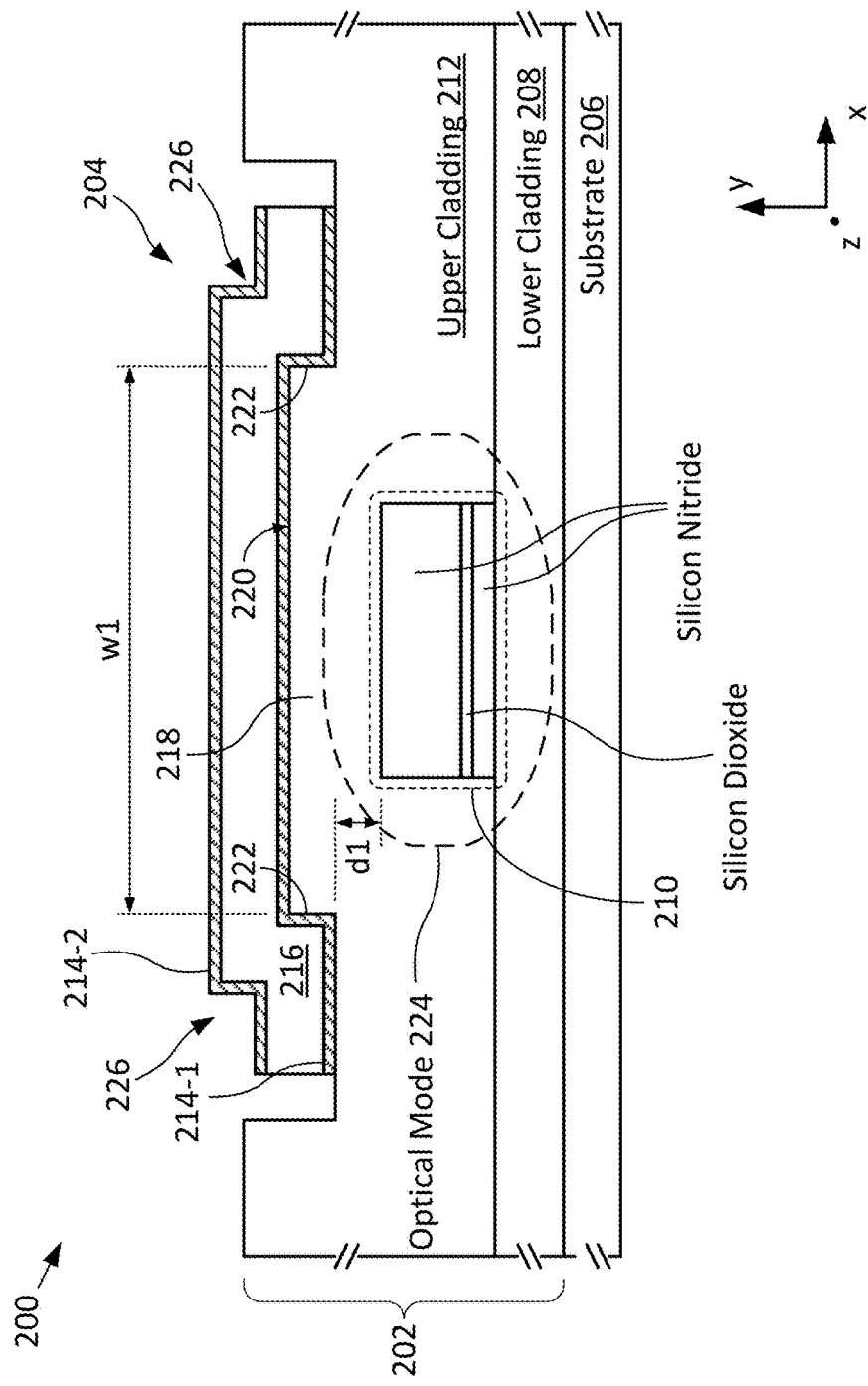
FIG. 2 depicts a schematic drawing of a cross-sectional view of a stress-optic phase controller in accordance with the prior art.

FIG. 2 depicts a schematic drawing of a cross-sectional view of a stress-optic phase controller in accordance with the prior art. Phase controller 200 includes waveguide structure 202 and stress-optic phase-control (PC) element 204. The view shown in FIG. 2 is analogous to the view through line a-a of FIG. 1.

Waveguide structure 202 is a high-index-contrast waveguide that includes lower cladding 208, core 210, and upper cladding 212, which are disposed on underlying substrate 206. As discussed in U.S. Pat. No. 9,764,352, the upper and lower cladding layers and the core are configured to tightly confine a light signal propagating through the waveguide structure such that its mode profile extends only slightly into the cladding layers. In the depicted example, the cladding layers are layers of silicon dioxide and the core is a multi-layer core comprising lower and upper layers of silicon nitride and a central layer of silicon dioxide. Upper cladding 212 includes projection 218, which is disposed above core 210.

In the depicted example, waveguide structure 202 supports an optical mode having mode field 224, which is substantially elliptical.

PC element 204 includes electrode layers 214-1 and 214-2, piezoelectric layer 216. Piezoelectric layer 216 resides between electrode layers 214-1 and 214-2 and all three layers are formed such that they are disposed on at least the top and side surfaces of projection 218 (i.e., top surface 220 and side surfaces 222). As a result, PC element 224 includes stress concentration points 226, which are located at its sharp interior and exterior corners.

The geometry of PC element 204 enables it to impart and control both horizontal and vertical stress tensors in the waveguide layers of waveguide structure 202.

Furthermore, PC element 204 is formed in a recessed region of upper cladding 212 such that the PC element is located near enough to core 210 to enable it to induce stress in the core and upper cladding materials. The distribution of the lateral and vertical stresses induced in the waveguide layers is controlled by controlling the ratio of the width, w1, of projection 218 to the separation distance, d1, between core 210 and the bottom of the projection. In fact, it was found that by keeping this ratio within the range of approximately 2.5:1 to approximately 6:1, a measure of control over the modal birefringence in a surface waveguide could be achieved.

It should be noted that in phase controller 200, the entirety of phase-control element 204, including its stress concentration points 226, is located above core 210. In addition, the shape of phase-control element is that of a partial rectangle. As a result, the shape of the phase-control element is not matched to the optical mode that it is designed to affect. For the purposes of this Specification, including the appended claims, a shape is defined as "matched" to a mode field over a given distance if the separation between them varies by less than 20% of the mode-field diameter over that distance. Specifically, the separation between phase-controller 204 and mode field 224 increases dramatically near the interior corners of lower electrode 214-1, as compared to the small separation between the top of mode field 224 and PC element 204 at the center of the optical mode.

It is an aspect of the present invention, however, that the efficiency of a stress-optic phase controller is improved by forming its phase-control element on a projection above the core of a waveguide such that:

i. the shape of the phase-control element matches the shape of the mode field of light signal being controlled; and
  ii. at least some of the stress concentration points of the phase controller reside at or below at least a portion of the core of the waveguide with which it is operatively coupled.

As a result, phase controllers of the present invention more effectively induce refractive-index changes in the light-guiding materials, which enable it to induce a $2\pi$ phase change in a light signal at a lower drive voltage and/or over a shorter interaction length.

It is another aspect of the present invention that these desired features of a phase controller can be readily achieved via a process that forms the projection by partially etching the lower cladding to create a ridge-like projection and overcoating this projection via conformal deposition of the upper cladding material. Furthermore, fabrication processes in accordance with the present invention provide independent control over the geometry of the waveguide core, the thicknesses of the upper and lower cladding layers, and the relative positions of the waveguide core and the phase-control element. As a result, embodiments of the present invention are applicable to virtually any surface waveguide structure and technology.

Still further, the independence of the geometry of the waveguide structure and phase-control element enables each to be fabricated to attain high functionality without degrading the functionality of the other. For example, the phase controller can be located at any desired height that enables it to efficiently induce stress in the core. In some prior-art phase controllers, such as those disclosed by Tsia, et al., the position and shape of the phase-control element is inextricably linked to the shape of the waveguide core, since it is the shape of the core that determines the topology on which the phase-control element is formed.

It should be noted that relative terms, such as "above" and "below" are used herein to describe physical relationships of features disposed on a substrate with respect to the substrate. In other words, for the purposes of this Specification, including the appended claims, the terms "above" and "below" are defined as meaning at greater and lesser distances, respectively, from an underlying substrate.

Figure 3:
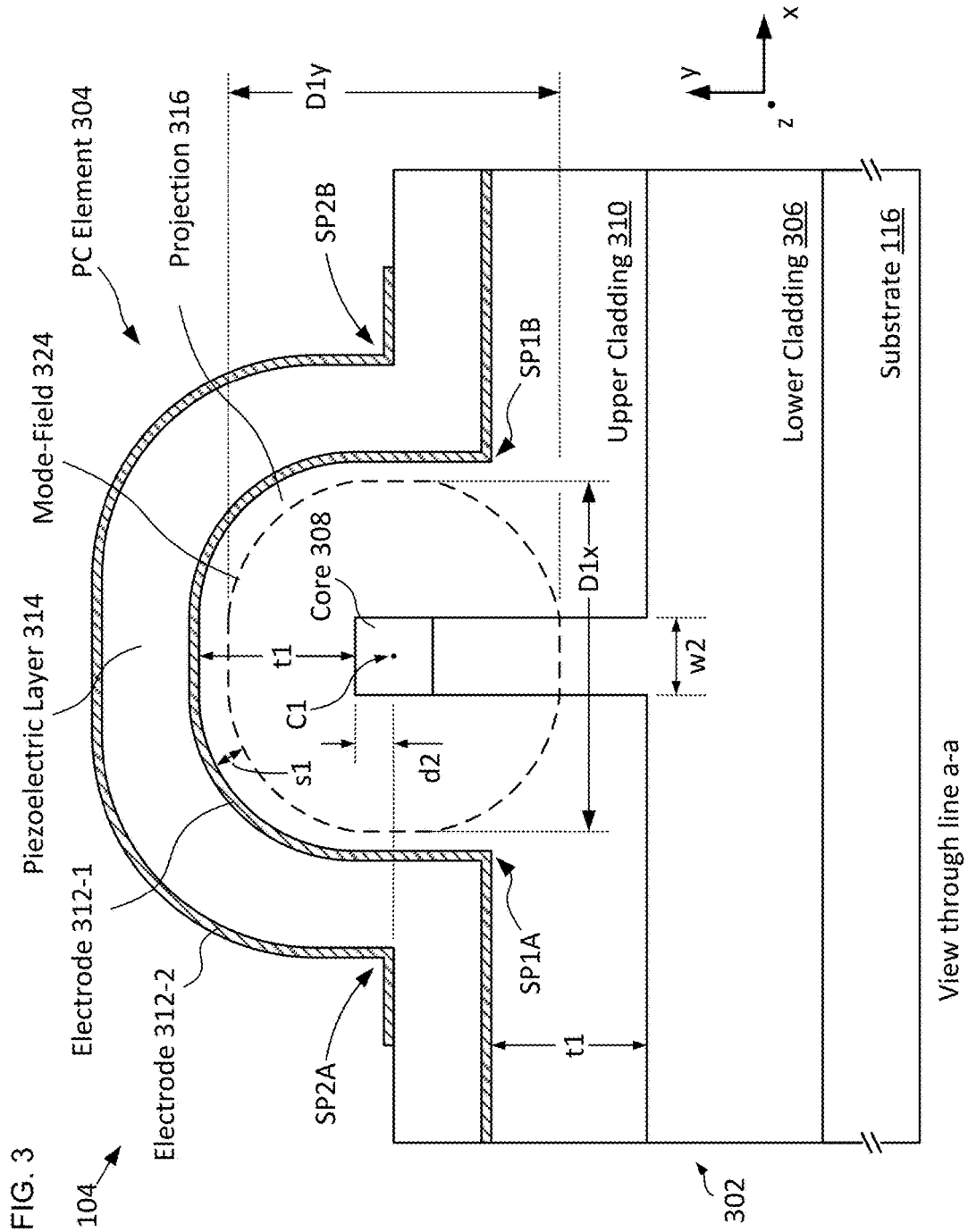
FIG. 3 depicts a schematic drawing of a cross-sectional view of stress-optics phase controller in accordance with the illustrative embodiment of the present invention.

FIG. 3 depicts a schematic drawing of a cross-sectional view of stress-optics phase controller in accordance with the illustrative embodiment of the present invention. Phase controller 104 includes waveguide structure 302 and phase-control (PC) element 304. The view shown in FIG. 3 is taken through line a-a of FIG. 1.

Waveguide structure 302 is that of a surface waveguide having a multi-layer core comprising two silicon nitride layers that are above and below a silicon dioxide layer (typically referred to as a "double-stripe" waveguide). The materials and geometry of waveguide structure 302 are selected to enable it to guide light signals 112, 112A, 112B, and 114 such that each light signal has mode field 324. In the depicted example, mode field 324 is a slightly elliptical mode field centered at core center C1 having a width, D1$x$, of 1.62 microns in the x-direction and a width, D1$y$, of 1.56 microns in the y-direction. Mode field 324, therefore, has an average mode-field diameter, D1, of 1.58 microns.

It should be noted that, although the illustrative embodiment includes a waveguide structure having a multi-layer core that defines a double-stripe waveguide, the present invention is suitable for use with virtually any waveguide structure that includes suitable core structure and/or materials. Other waveguide structures suitable for use in embodiments of the present invention include, without limitation: single-layer-core waveguides whose cores include a dielectric material (e.g., silicon nitride, doped or undoped silicon oxide, silicon oxynitride, etc.), a semiconductor or semiconductor compound, (e.g., silicon, a compound semiconductor, silicon carbide, silicon germanium, etc.), and the like; and multi-layer-core waveguides whose cores comprise one or more dielectric materials, one or more semiconductor materials, combinations of dielectric and semiconductor materials, and the like.

PC element 304 is analogous to PC element 204 described above and with respect to FIG. 2; however, PC element 304 has several differences as compared to PC element 204 that enable it to more efficiently impart a phase change on light signal 112B. Chief among these differences are that the shape of PC element 304 substantially matches the shape of mode field 324 and its stress-concentration points reside at or below features of core 308.

Figure 4:
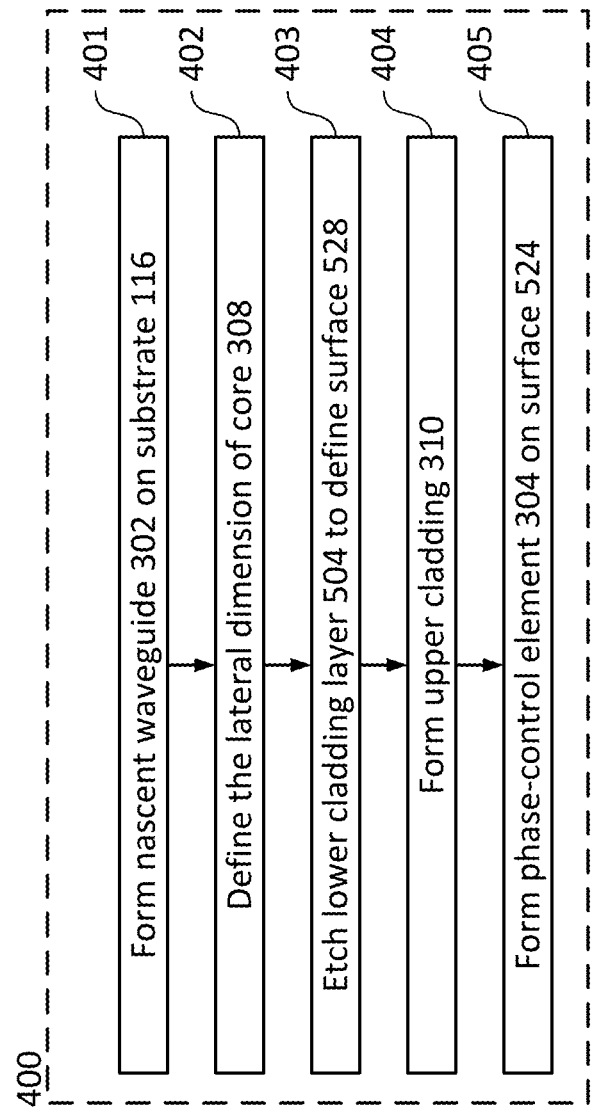
FIG. 4 depicts operations of a method suitable for forming a stress-optic phase controller in accordance with the illustrative embodiment.

FIG. 4 depicts operations of a method suitable for forming a stress-optic phase controller in accordance with the illustrative embodiment. Method 400 is described herein with continuing reference to FIGS. 1 and 3, as well as reference to FIGS. 5A-D.

FIGS. 5A-D depict schematic drawings of cross-sectional views of phase controller 104 at different points in its fabrication. The views shown in FIGS. 5A-D are taken through line a-a of FIG. 1.

Method 400 begins with operation 401, wherein layer structure 502 is formed on substrate 116. Layer structure 502 includes lower cladding layer 504, lower core layer 508, central core layer 510, and upper core layer 512. Lower core layer 508, central core layer 510, and upper core layer 512 collectively define the layer stack of core 308, which is disposed on surface 506 of the lower cladding layer.

Figure 5A:
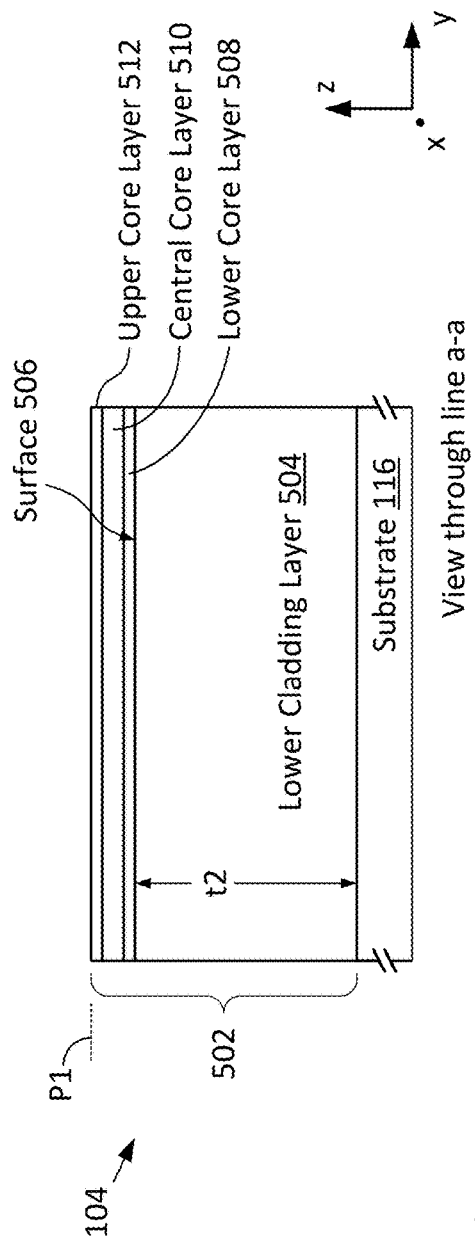

FIG. 5A depicts nascent waveguide structure 302 after the formation of layer structure 502.

In the depicted example, lower cladding layer 504 is a layer of silicon dioxide having thickness, t2, which is sufficient to mitigate optical coupling of mode field 324 into substrate 116. In the depicted example, t2 is approximately 10 microns; however, one skilled in the art will recognize, after reading this Specification, that other materials and/or thicknesses can be used in lower cladding layer 504 without departing from the scope of the present invention.

Each of lower core layer 508 and upper core layer 512 is a layer of stoichiometric silicon nitride having a thickness of 170 nm. Central core layer 510 is a layer of stoichiometric silicon dioxide having a thicknesses of 500 nm. Top surface 514 of upper core layer 512 defines plane P1.

At operation 402, core layers 508, 510, and 512 are patterned via conventional photolithography and reactive-ion etching (RIE) to define the width, w2, of core 308. In the depicted example, w2 is equal to 1.2 microns; however, other core widths can be used without departing from the scope of the present invention. Once its width has been defined, core 308 is fully formed and its top surface 514 remains co-incident with plane P1.

At operation 403, the exposed regions of lower cladding layer 504 are etched back from surface 506 by over-etch depth d3, thereby defining field region 516 and spine 530, where field region 516 has thickness, t3, and surface 528. Typically, operations 402 and 403 occur in the same etch process; however, separate etching steps can be used in these operations without departing from the scope of the present invention.

Operations 402 and 403 collectively define ridge 518, which includes core 308 disposed on spine 530 and has a total height of d4. In the depicted example, the lower cladding is etched back by 4 microns (i.e., t3 is equal to 6 microns) and the total thickness of core 308 is 0.84 microns; therefore, d4 is equal to 4.84 microns.

Figure 5B:
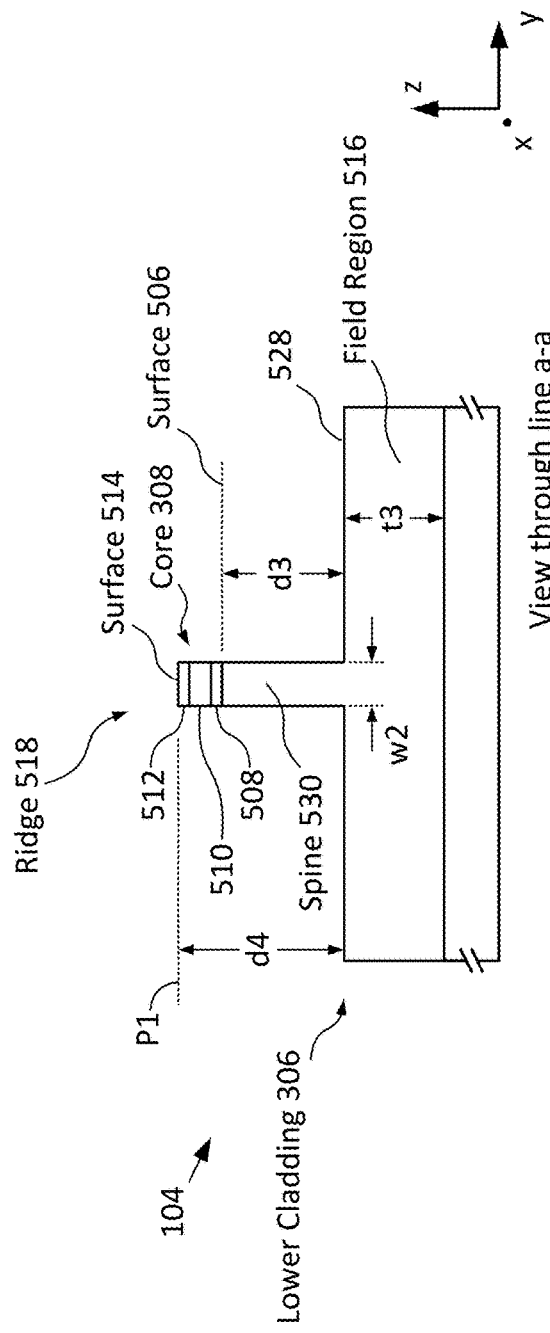

In the illustrative embodiment depicted in FIGS. 5B through 5D, ridge 518 has "vertical" sidewalls (i.e., orthogonal with respect to surface 528 in FIG. 5B). In some other embodiments, however, the sidewalls of the ridge are not vertical. For example, ridge 518 can have a pyramidal-like shape, wherein the sidewalls form an angle with respect to surface 528 that is not 90 degrees. It is within the capabilities of those skilled in the art to form ridge 518 with non-vertical sidewalls.

FIG. 5B depicts nascent phase controller 104 after lower cladding 306 and core 308 are fully defined.

At operation 404, upper cladding 310 is formed by depositing, in conformal fashion, a layer of silicon dioxide having thickness t1 on surface 528 and ridge 518. Typically, upper cladding 310 is formed via low-pressure chemical vapor deposition (LPCVD) using tetraethyl orthosilicate (TEOS) as a precursor gas; however, one skilled in the art will recognize, after reading this Specification, that several conformal deposition processes suitable for use in the present invention are known in the prior art. As discussed below, thickness t1 is selected such that it is less than or equal to d4. In the depicted example, t1 is equal to 2 microns; however, other thicknesses for top cladding 310 can be used without departing from the scope of the present invention.

FIG. 5C depicts phase controller 104 after the formation of upper cladding 310.

Because it is a conformal layer, the upper cladding has substantially the same thickness (i.e., t1) on each surface on which it is deposited, thereby giving rise to field region 520 and projection 316. Projection 316 has outer surface 522 and field region 520 has top surface 524, which defines plane P2. The shape of surfaces 522 and 524 is based on the topography of lower core 306 and ridge 518.

At operation 405, phase-control element 304 is formed, in conformal fashion, on surface 524. PC element 304 includes electrodes 312-1 and 312-2 and piezoelectric layer 314, which is disposed between the electrodes.

FIG. 5D depicts phase controller 104 after the formation of upper cladding 310.

Each of electrodes 312-1 and 312-2 is an electrically conductive structure comprising an adhesion layer and a highly conductive layer. In the depicted example, each of electrodes 312-1 and 312-2 includes titanium and platinum and has a combined thickness of approximately 100 nm.

Piezoelectric layer 314 is a layer of lead zirconate titanate (PZT) having a thickness of approximately 2 microns. In some embodiments, piezoelectric layer 314 comprises a different piezoelectric material and/or a different thickness.

The formation of PC element 304 on projection 316 and field region 520 produces stress-concentration points SP1A, SP1B, SP2A, and SP2B. Stress concentration points SP1A, SP1B, SP2A, and SP2B function to direct stress tensors toward core 308.

In the depicted example, electrode 312-2 extends laterally onto surface 526 with width, w3. One skilled in the art will recognize, after reading this Specification, that the magnitude of w3 can affect the magnitude and direction of the stress tensors that propagate from stress-concentration points SP1A, SP1B, SP2A, and SP2B. In some embodiments, w3 is equal to zero (i.e., the electrode stops at stress-concentration points SP2A and SP2B).

Top surface 514 of core 308 defines plane P1, while surface 526 defines the position of top electrode 312-2 and plane P3, which is below plane P1. Planes P1 and P3 are separated by distance d2. In the depicted example, d2 is equal to 0.74 microns. In some embodiments, planes P1 and P3 are coplanar.

The shape of PC element 304 is defined by surface 522 of upper cladding 310, which wraps around the top and sides of core 308. The shape of mode field 324 is defined by the shape and refractive index configuration of core 308. As a result, between stress-concentration points SP1A and SP1B, the shape of PC element 304 is substantially matched to the slightly elliptical shape of optical mode 314 (i.e., separation s1 does not vary by more than 20% of D1 along this length).

Furthermore, in some embodiments, the thickness, t1, of upper cladding 310 is selected such that the extent of projection 316 is only slightly larger than the average mode-field diameter, D1, thereby enabling highly efficient coupling of stress induced by PC element 304 into the materials that support the mode field. It should be noted, however, that optical loss in the waveguide typically increases as the magnitude of t1 decreases to approach D1. In some embodiments of the present invention, such as those in which low optical loss is critical, the thickness of t1 is increased to mitigate optical loss at the expense of operating efficiency in phase controller 104.

Still further, as discussed above, embodiments of the present invention derive significant advantage by ensuring that at least some features of PC element 304 reside at or below the top of core 308. Furthermore, even higher efficiency is achieved for phase controller 104 when plane P3 is equal to or below plane P1.

Figure 6:
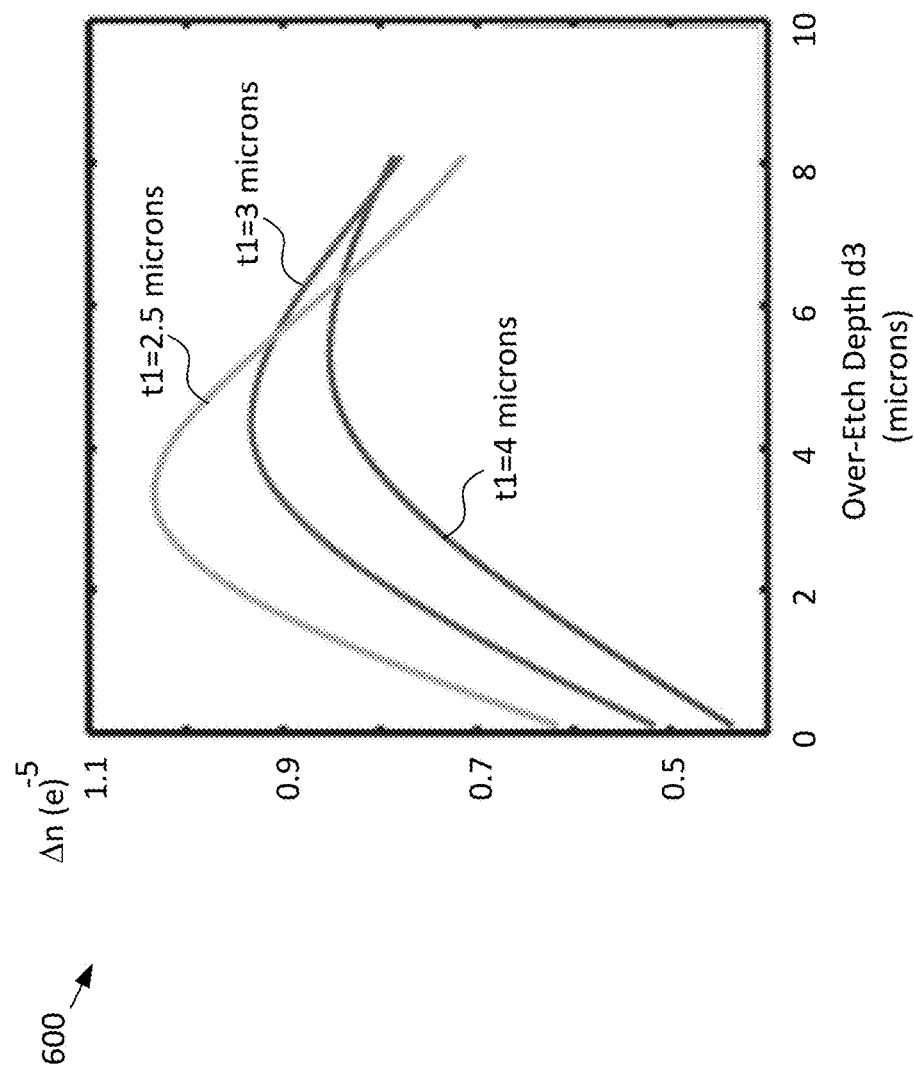
FIG. 6 depicts a simulation of induced refractive index change versus over-etch depth for a phase controller in accordance with the present invention.

FIG. 6 depicts a simulation of induced refractive index change versus over-etch depth for a phase controller in accordance with the present invention. Plot 600 shows the change in the effective refractive index of core 308 as a function of over-etch distance, d3 for a waveguide structure having top cladding thickness, t1, of 3 microns and a PC element whose piezoelectric layer has a thickness of approximately 2 micron.

It can be seen from plot 600 that the maximum change in effective refractive index is obtained for an over-etch depth that is approximately 1 micron greater than the thickness of the top cladding formed upon it. Specifically, for waveguide structures having top cladding thicknesses, t1, of 2.5, 3, and 4, the maximum index change occurs for over-etch depths, d3, of approximately 3.5, 4, and 5 microns, respectively.

One skilled in the art will recognize that the relative heights of planes P1, P2, and P3 above substrate 116 are based on several factors, including over-etch depth d3, the thickness, t1, of top cladding 310, the thickness of piezoelectric layer 314, and the thicknesses of electrodes 312-1 and 312-2.

In some applications, a phase controller that requires very little real estate is desirable. Some phase controllers in accordance with the present invention are formed such that they follow a serpentine path along the surface of substrate 116 to increase their interaction length without significantly increasing the chip real estate they require.

Figure 7:
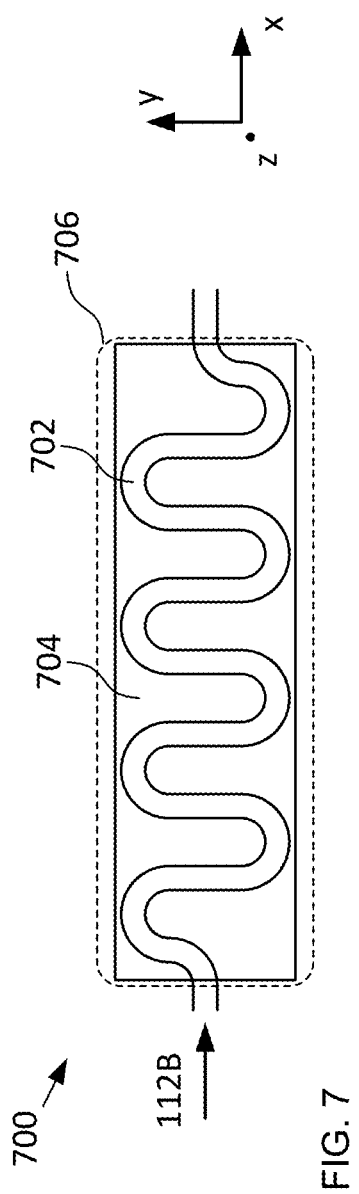
FIG. 7 depicts a schematic drawing of a top view of a phase controller in accordance with a first alternative embodiment of the present invention.

FIG. 7 depicts a schematic drawing of a top view of a phase controller in accordance with a first alternative embodiment of the present invention. Phase controller 700 includes waveguide 702 and PC element 704.

Waveguide 702 is analogous to waveguide 302 described above; however, waveguide 702 follows a serpentine path through area 706.

PC element 704 is analogous to PC element 304 described above; however, PC element 704 is formed as a rectangular field disposed over waveguide 702 in area 706.

It should be noted that, preferably, waveguide 702 is a high-index-contrast waveguide that tightly confines its optical mode within its core, which mitigates optical loss at waveguide turns (i.e., bending losses). As a result, waveguide 702 can have tighter bending radii and a higher density path through area 706, which enables a longer interaction length than a comparable straight waveguide without a significant increase in propagation loss.

Unfortunately, PC element 704 is characterized by a high capacitance due to its large area—much of which is ineffective for inducing a phase change in light signal 112B.

Figure 8:
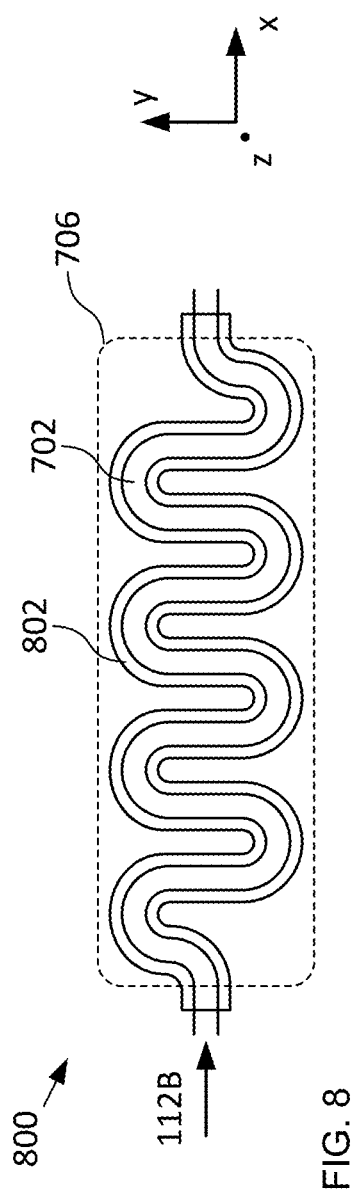
FIG. 8 depicts a schematic drawing of a top view of a phase controller in accordance with a second alternative embodiment of the present invention.

FIG. 8 depicts a schematic drawing of a top view of a phase controller in accordance with a second alternative embodiment of the present invention. Phase controller 800 includes waveguide 702 and PC element 804.

PC element 804 is analogous to PC element 704 described above; however, PC element 804 follows the same serpentine path through area 706 as waveguide 702. As a result, PC element 804 has a much smaller capacitance and, therefore, phase controller 800 can operate at high speed than phase controller 700.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A phase controller comprising:
   a surface waveguide that is operative for conveying a light signal, the surface waveguide comprising:
      a first cladding having a first field region and a spine that projects from the first field region;
      a core that is disposed on the spine, wherein the core has a first surface that defines a first plane, and wherein the core and the spine collectively define a ridge; and
      a second cladding that includes a second field region and a projection that projects from the second field region, wherein the second cladding is conformally disposed on the first field region and the ridge such that the ridge and the second cladding collectively define the projection, and wherein the second field region has a second surface that defines a second plane, and further wherein the projection has a third surface; and
   a phase-control (PC) element disposed on the surface waveguide, the PC element comprising:
      a first electrode that is in direct contact with the third surface;
      a second electrode that is distal to the third surface; and
      a piezoelectric layer that is between the first and second electrodes;
      wherein the PC element includes a first stress-concentration point.

2. The phase controller of claim 1 wherein the light signal has a mode field having a first shape, and wherein the third surface has a second shape that is matched to the first shape, and wherein the PC element has the second shape.

3. The phase controller of claim 1 wherein the first stress-concentration point is at or below the first plane.

4. The phase controller of claim 1 wherein the PC element includes a plurality of stress-concentration points that includes the first stress-concentration point, and wherein each of the plurality of stress-concentration points is at or below the first plane.

5. The phase controller of claim 1 wherein the light signal has a mode field having a first shape, and wherein each of the third surface and the PC element has a second shape that is matched to the first shape, and further wherein the first stress-concentration point is at or below the first plane.

6. The phase controller of claim 1 wherein the second electrode is disposed on the projection and a first portion of the second field region, the first portion having a first width.

7. The phase controller of claim 1 wherein the surface waveguide has a first shape within a first area, the first shape being serpentine, and wherein the PC element is disposed on the surface waveguide in the first area.

8. The phase controller of claim 7 wherein the PC element has the first shape within the first area.

9. The phase controller of claim 1 wherein the core comprises a first core layer, a second core layer, and a third core layer that is between the first and second core layers, and wherein the first and second core layers comprise silicon nitride and the third core layer comprises silicon dioxide, and further wherein the third core layer includes the first surface.

10. The phase controller of claim 1 wherein the surface waveguide is a single-core waveguide, and wherein the core includes a first core layer that comprises a first material selected from the group consisting of a dielectric, a semiconductor, and a semiconductor compound.

11. A phase controller comprising:
    a surface waveguide that is operative for conveying a light signal, the surface waveguide comprising:
       a first cladding having a first field region and a spine that projects from the first field region;
       a core that is disposed on the spine, wherein the core has a first surface that defines a first plane, and wherein the core and the spine collectively define a ridge; and
       a second cladding that includes a second field region and a projection that projects from the second field region, wherein the second cladding is conformally disposed on the first field region and the ridge such that the ridge and the second cladding collectively define the projection, and wherein the second field region has a second surface that defines a second plane, and further wherein the projection has a third surface; and
    a phase-control (PC) element disposed on the surface waveguide, the PC element comprising:
       a first electrode;
       a second electrode; and
       a piezoelectric layer that is between the first and second electrodes;
       wherein the PC element includes a first stress-concentration point.

12. The phase controller of claim 11 wherein the light signal has a mode field having a first shape, and wherein the third surface has a second shape that is matched to the first shape, and wherein the PC element has the second shape.

13. The phase controller of claim 11 wherein the first stress-concentration point is at or below the first plane.

14. The phase controller of claim 11 wherein the surface waveguide has a first shape within a first area, the first shape being serpentine, and wherein the PC element is disposed on the surface waveguide in the first area.

* * * * *